United States Patent
Ogikubo et al.

(10) Patent No.: US 7,468,829 B2
(45) Date of Patent: Dec. 23, 2008

(54) MICROELECTROMECHANICAL MODULATION DEVICE AND MICROELECTROMECHANICAL MODULATION DEVICE ARRAY, AND IMAGE FORMING APPARATUS

(75) Inventors: Shinya Ogikubo, Kanagawa (JP); Hirochika Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 248 days.

(21) Appl. No.: 11/238,992

(22) Filed: Sep. 30, 2005

(65) Prior Publication Data

US 2006/0066931 A1    Mar. 30, 2006

(30) Foreign Application Priority Data

Sep. 30, 2004    (JP)    ............ P. 2004-287975

(51) Int. Cl.
    G02B 26/00    (2006.01)
    G02B 26/08    (2006.01)

(52) U.S. Cl. .............. 359/290; 359/223; 359/225

(58) Field of Classification Search .............. 359/245, 359/196, 223, 225, 226, 290, 295, 298
    See application file for complete search history.

(56) References Cited

U.S. PATENT DOCUMENTS

| 6,661,561 B2 * | 12/2003 | Fitzpatrick et al. ........... 359/291 |
| 6,972,883 B2 * | 12/2005 | Fujii et al. ................. 359/224 |
| 7,099,065 B2 * | 8/2006  | Patel et al. ................. 359/291 |

FOREIGN PATENT DOCUMENTS

| JP | 8-334709 A    | 12/1996 |
| JP | 2001-174720 A | 6/2001  |
| JP | 2002-36197 A  | 2/2002  |
| JP | 2002-169109 A | 6/2002  |

* cited by examiner

Primary Examiner—William C Choi
Assistant Examiner—Jack Dinh
(74) Attorney, Agent, or Firm—Sughrue Mion, PLLC

(57) ABSTRACT

A microelectromechanical modulation device comprising: a movable portion, which is supported to be elastically and bi-directionally displaced and which has a modulation function; and a plurality of driving sources operative to apply a physical action force to said movable portion, wherein when said movable portion is displacement-driven in a first direction, a physical action force for suppressing oscillation of said movable portion is applied to said movable portion in a second direction different from the first direction by said drive sources while said movable portion is transited in the first direction.

13 Claims, 16 Drawing Sheets

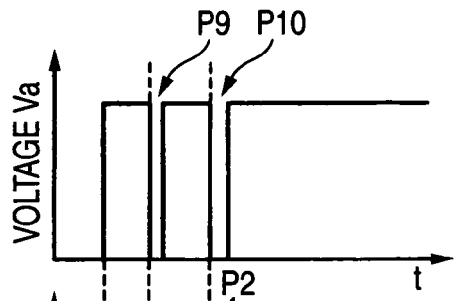
FIG. 10A
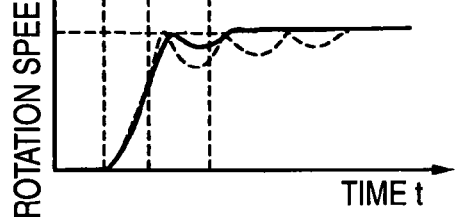
FIG. 10B
FIG. 10C
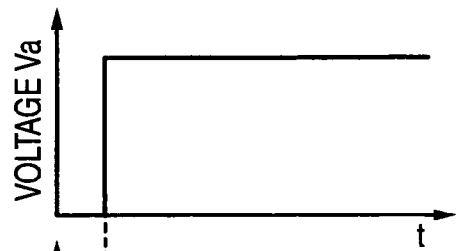
FIG. 11A
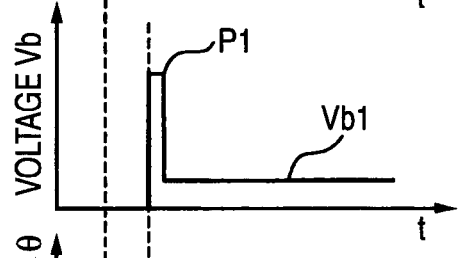
FIG. 11B
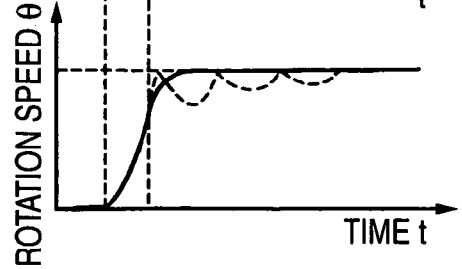
FIG. 11C

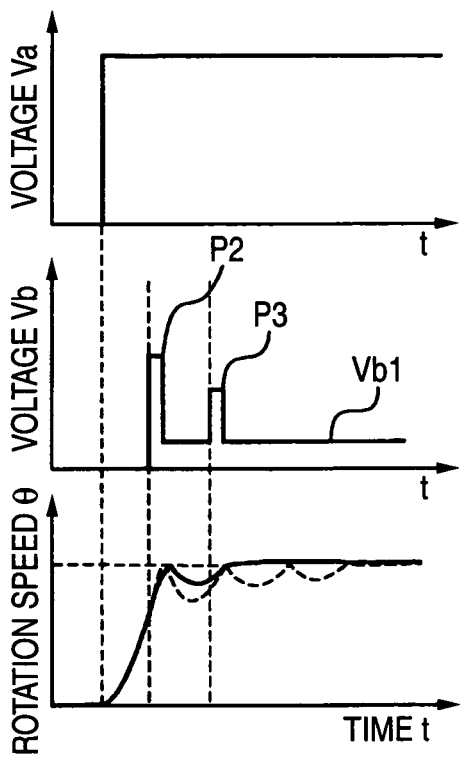
FIG. 12A
FIG. 12B
FIG. 12C
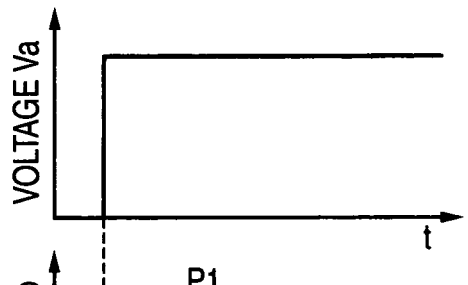
FIG. 13A
FIG. 13B
FIG. 13C

WITHOUT OSCILLATION
SUPPRESSING VOLTAGE

WITH OSCILLATION
SUPPRESSING VOLTAGE ved by reference. This claim for priority
MICROELECTROMECHANICAL MODULATION DEVICE AND MICROELECTROMECHANICAL MODULATION DEVICE ARRAY, AND IMAGE FORMING APPARATUS This application is based on Japanese Patent application JP 2004-287975, filed Sep. 30, 2004, the entire content of which is hereby incorporated by reference. This claim for priority benefit is being filed concurrently with the filing of this application.

BACKGROUND OF THE INVENTION

1. Technical Field of the Invention

The present invention relates to a microelectromechanical modulation device which has a movable portion that is bi-directionally displaced, to a microelectromechanical modulation device array, and to an image forming apparatus. More particularly, the present invention relates to improved techniques for damping the movable portion.

2. Description of the Related Art

In recent years, rapid progress of MEMS (MicroElectro-Mechanical Systems) technology has resulted in extensive development of a microelectromechanical modulation device that electrically displaces or moves a microstructure having a size in the order of micrometers. This microelectromechanical modulation device is, for example, a digital micromirror device (DMD), which deflects light by inclining a micromirror. The DMD is used for various purposes, such as a projection display, a video monitor, a graphic monitor, a television set, and an electrophotographic printing machine, in the field of optical information processing.

Generally, the microelectromechanical modulation device has a movable portion that is elastically displaceably supported and is bidirectionally displaced. This movable portion mainly performs a modulation operation. Therefore, it is very important for favorably performing a switching operation to control the damping of the movable portion.

For example, a micromirror device disclosed in JP-A-8-334709 (hereinafter referred to as JPA'709) is configured so that a voltage is applied to one of a pair of drive electrodes, and that a movable portion having the mirror difsposed between these electrodes is rotated by an electrostatic attracting force determined according to the difference in electrical potential between the movable portion and the drive electrode and to the electrostatic capacity therebetween.

Further, a method of damping ribbon devices in a microelectromechanical grating device disclosed in JP-A-2001-174720 (hereinafter referred to as JPA'720) is a method of damping electromechanical ribbon devices over a channel, which defines a bottom surface and has a bottom conductive layer formed below this bottom surface. This method includes the step of providing at least one constant amplitude voltage pulse to at least one ribbon device and the step of providing at least one damping pulse, which is separated by a narrow tentative gap from the constant amplitude voltage pulse, to the ribbon devices. That is, an electrostatic force is caused by one movable portion electrode and one fixed electrode of a parallel plate type device to act in a single direction. Further, the oscillation of the ribbon devices is controlled by a driving voltage, which used for attracting the ribbon device to a lower electrode, and two damping drive voltages that include an initial damping voltage, which is applied immediately before the application of the driving voltage, and a final damping voltage that is applied immediately after the application of the driving voltage.

Furthermore, an optical path switching device disclosed in JP-A-2002-169109 (hereinafter referred to as JPA'109) has a mechanical optical switch, which switches an optical path by applying a signal voltage to an electromagnetically driven actuator, and a control circuit that supplies a signal voltage to the optical switch. Regarding the signal voltage, let $V_H$ and T denote a rise amplitude and a width of a signal, respectively. When a time (T/2) elapses since the rise of the signal, the voltage level of the signal is equal or less than $(2/3)V_H$. Further, when a time (T/2) elapses since the rise of the signal having a width T, the signal voltage applied to the actuator is reduced to a value that is equal to or less than (2/3) times the rise amplitude to thereby suppress the oscillation of a movable portion.

Additionally, a method of controlling a micromachine device, which is disclosed in JP-A-2002-36197 (hereinafter referred to as JPA'197), is such that a first control signal and a second control signal are supplied to the micromachine device, that the second control signal sets the micromachine device to be in an active state, and that the first control signal causes this state of the micromachine device to maintain this state. The micromachine device is controlled by using at least two control signals, one of which sets the micromachine device to be in a pull-in state, and the other of which causes the micromachine device to maintain the pull-in state thereof. This enables the control of the micromachine device at a low voltage level.

However, in the micromirror device disclosed in JPA'709, a voltage is applied to one of the drive electrodes. An electrostatic attracting force is generated according to the difference in potential between the movable portion and the drive electrode and the electrostatic capacity therebetween. Thus, the movable portion is rotated. Consequently, as illustrated in FIG. 21A, a micromirror is transited to a contact position by the application of a voltage Va to the drive electrode. Immediately after the micromirror reaches the contact position, the mirror receives a reaction force from a contact member. Thus, the oscillation of the movable portion occurs. Even in a non-contact structure in which the micromirror does not reach the contact position, as illustrated in FIG. 21B, the movable portion passes over a desired angle (that is, a convergence position), so that an overshoot of the mirror occurs. Consequently, it takes time to stop the oscillation. Such oscillation and overshoots hinder the speeding-up of a switching operation of the microelectromechanical modulation device.

Further, in the case of the micromechanical grating device disclosed in JPA'720, as illustrated in FIG. 22A, the constant amplitude voltage pulse 1 is a function of time. The constant amplitude voltage pulse 1 has a duration of 2 µseconds and also has a voltage value of 10V. Just after the constant amplitude voltage pulse 1, a narrow damping pulse 5 separated from the constant amplitude voltage pulse 1 by a narrow gap 3 is applied. Furthermore, as illustrated in FIG. 22B, in a case where an adjacent contact amplitude voltage pulse 7 has an opposite polarity, the polarity of a damping pulse 9 is opposite to that of the associated voltage pulse 7. However, this microelectromechanical grating device is what is called the parallel plate type microelectromechanical modulation device configured so that a ribbon serving as a movable portion is parallel displaced to a substrate, and that thus, damping is performed by applying pulses to one movable-portion-side electrode and one fixed side electrode facing this movable-portion-side electrode. Consequently, this device has a disadvantage in that this device is poor in diversity of oscillation control methods. For instance, when the movable portion is attracted and displaced to the substrate, an opposite damping force cannot be applied to the movable portion. That is, the oscillation thereof cannot be actively reduced.

Moreover, the optical path switching device disclosed in JPA'109 is adapted so that when the movable portion approaches an end of a yoke in the electromagnetically-driven actuator, that is, when the attracting force due to the magnitude of a magnetic field of the permanent magnet is enhanced, the movable portion is moved to a fiber-connection position so as to reduce the magnitude of the attracting force due to a coil magnetic field to thereby prevent the magnitude of a total attracting force from becoming too high. A signal outputted from a signal generation circuit has a waveform representing a signal voltage whose rise voltage $V_H$ is 7V and whose level drastically drops after the rise. The width T of the signal is 5 ms. The voltage at an end of the signal is 0.5V. When a time (T/2) elapses since the rise of the signal, the voltage level of the signal is 2.8V. In a case illustrated in FIG. 23B, the rise voltage is 7V. The width T of the signal is 5 ms. A time T0, in which the amplitude changes like a step, is 1.5 ms. In a case illustrated in FIG. 23C, the rise voltage is 5V. A time T', which is taken until the reduced amplitude reaches 1V, is 2 ms. The time T' corresponds to the width T of a signal. The application of the voltage of 1V is continued until the next switching is performed after the lapse of the time T'. In a case illustrated in FIG. 23D, the rise voltage is 5V. The time T0, in which the amplitude changes like a step, is 3 ms. A waveform is changed like a step, so that the amplitude is reduced to a constant value of 0.5V. The rise amplitudes of the waveforms representing these signal voltages are set to be large thereby to speed up the movement of the movable portion (that is, increase the switching rate thereof). When the movable portion starts to move, the signal voltage is rapidly lowered to thereby reduce the magnitude of the force applied to the movable portion. Thus, chattering can be suppressed. However, this optical path switching device is adapted so that the a block serving as the movable portion is bidirectionally parallel displaced, and that the oscillation of the movable portion is suppressed by changing a driving force acting in a forward direction. Consequently, this optical path switching device has a disadvantage in that this device is poor in diversity of oscillation control methods. Also, this optical path switching device is adapted so that basically, the magnitude of an attracting force due to the coil magnetic field is reduced, and that the signal voltage is reduced so as to prevent the magnitude of a total attracting force from being too high. Thus, similarly to the microelectromechanical grating device, this optical path switching device cannot actively reduce the oscillation of the movable portion.

Furthermore, according to the method of controlling a micromachine device, which is disclosed in JPA'197, the micromachine device is controlled by using a single or a plurality of control signals. FIGS. 24A to 24H show exemplary waveforms of this control signal. As is seen from FIGS. 24A and 24b, the control signal may be a pulse train that changes the state of the micromachine device. Similarly, in the case of using at least two control signals, these signals may be a signal synthesized from superimposed signals respectively shown illustrated in FIGS. 22C and 22D, an amplitude modulated (AM) signal illustrated in FIG. 24E, a frequency modulated (FM) signal illustrated in FIG. 24F, a pulse width modulated (PWM) signal, and a pulse density modulated (PDM) signal illustrated in FIG. 24H. However, this control method aims at reduction of a holding voltage in the pull-in state, reduction of an on/off delay due to discharge of residual electric charges, and increase in amplitude of an output signal. Thus, this control method cannot actively reduce the oscillation of the movable portion.

SUMMARY OF THE INVENTION

The invention is accomplished in view of the aforementioned circumstances. An object of the invention is to provide a microelectromechanical modulation device enabled to actively reduce the oscillation of a movable portion by exerting a physically attracting force in a direction opposite to the direction of transition of a movable portion, and is to provide a microelectromechanical modulation device array and is to provide an image forming apparatus, thereby speeding up a switching operation. The foregoing object is achieved by the following configuration.

(1). A microelectromechanical modulation device comprising:

a movable portion, which is supported to be elastically and bi-directionally displaced and which has a modulation function; and a plurality of driving sources operative to apply a physical action force to said movable portion, wherein when said movable portion is displacement-driven in a first direction, a physical action force for suppressing oscillation of said movable portion is applied to said movable portion in a second direction different from the first direction by said drive sources while said movable portion is transited in the first direction.

The modulation device is adapted so that during the transition of the movable portion before reaching the final displacement position, a physical attracting force acts in a direction opposite to the direction of the transition, and that the speed of the movable portion is reduced just before the movable portion reaches the final displacement position. This suppresses occurrence of oscillation due to a collision, which would be caused when the movable portion of the related art device reached the final displacement position at a high speed, and also suppresses occurrence of an overshoot, which would be caused when the movable portion of the related art device reached the final displacement position during the noncontact driving thereof. That is, the oscillation of the movable portion, which is caused when the movable portion is put into contact with a stopping member, can be actively reduced.

(2). The microelectromechanical modulation device according to (1), wherein a physical action force is applied to said movable portion by said drive sources in the first direction during said movable portion is transited in the second direction after said movable portion is displacement-driven in the first direction.

According to an embodiment of the modulation device of the invention, the movable portion is displacement-driven in the first direction. After the movable portion reaches the final position, a physical action force acting in the first direction is exerted on the movable portion during the movable portion is transited in the second direction by a reaction force or an elastic force caused when the movable portion abuts against the stopping member. Thus, when departing from the final displacement position, the movement of the movable portion is actively braked.

(3). The microelectromechanical modulation device according to (1) or (2), wherein the physical action force is exerted to a plurality of points of action of said movable portion.

This modulation device of an embodiment of the invention employs a plurality of points of action. Thus, for example, a swing type movable portion, whose center serves as the center of rotation thereof, is adapted so that the physical action force is applied to both sides of the center of rotation. Consequently, damping forces respectively having different magnitudes can be applied to the points of action at different moments. Thus, various damping effects can be obtained.

(4). The microelectromechanical modulation device according to any one of (1) to (3), wherein when said movable portion reaches a final position of displacement in a specific direction, a speed of said movable portion is substantially 0.

According to an embodiment of the modulation device of the invention, when the movable portion reaches the final position of the displacement in the specific direction, the speed of the movable portion is substantially zero at that moment. This prevents occurrence of oscillation due to a collision, which would be caused when the movable portion of the related art device reached the final displacement position at a high speed, and also prevents occurrence of an overshoot, which would be caused when the movable portion of the related device reached the final displacement position during the noncontact driving thereof.

(5). The microelectromechanical modulation device according to any one of (1) to (4), wherein the physical action force, which is exerted by said drive sources and which displaces said movable portion in the first direction and the second direction, is an electrostatic force.

According to an embodiment of the modulation device of the invention, the physical action force is an electrostatic force. Thus, a high-speed oscillation suppressing force is obtained.

(6). The microelectromechanical modulation device according to any one of (1) to (5), wherein each of the physical action forces is applied so that a magnitude of the physical action force varies with time like a pulse waveform whose ordinates represent magnitudes and whose abscissa represent time.

According to an embodiment of the modulation device of the invention, the physical action force is generated within a range specified by the pulse waveform. Consequently, various damping effects are obtained. Incidentally, the pulse waveform includes the waveforms of a rectangular wave, a sinusoidal wave, a cosine wave, a saw tooth wave, a triangular wave, and waves synthesized from these waves.

(7). The microelectromechanical modulation device according to (6), wherein the physical action forces are generated so that magnitudes of the physical action forces vary with time like a plurality of pulse waveforms.

According to an embodiment of the modulation device of the invention, physical action forces having different magnitudes are applied to the points of action at different moments. Thus, various damping effects can be obtained.

(8). The microelectromechanical modulation device according to any one of (1) to (7), wherein two or more physical action forces can be set corresponding to each of directions of transition of said movable portion.

According to an embodiment of the modulation device of the invention, for instance, the swing type movable portion, whose center serves as the center of rotation thereof, is adapted so that two or more physical action forces are applied to each of both sides of the center of rotation. Consequently, different damping forces respectively having different magnitudes can be applied to each of the sides of the movable portion at different moments. Thus, various damping effects can be obtained.

(9). The microelectromechanical modulation device according to any one of (1) to (8), wherein when said movable portion reaches a final position of displacement in a specific direction, said movable portion touches a stopping member and is stopped.

According to an embodiment of the modulation device of the invention, when the movable portion reaches the final position, the movable portion touches the stopping member (or the landing site) and is stopped. That is, this modulation device of the embodiment is operated as that of what is called the contact type. In this case, the movable portion receives a reaction force from the stopping member. However, the movable portion is braked by the electrostatic attracting force, and is forcibly damped.

(10). A microelectromechanical modulation device array comprising said microelectromechanical modulation devices according to any one of (1) to (9), which are one-dimensionally or two-dimensionally arranged.

According to an embodiment of the modulation device array of the invention, the modulation devices enabled to perform high-speed switching operations are formed into an array. This enables the reduction of an oscillation stopping time. Consequently, the writing of address voltages can be performed earlier, as compared with a related array.

(11). The microelectromechanical modulation device array according to (10), wherein each of said microelectromechanical modulation devices has a driving circuit including a memory circuit; and one of electrodes provided on said movable portion and at leas two fixed portions facing said movable portion is a signal electrode, to which an device displacement signal outputted from said driving circuit is inputted, and another of said electrodes is a common electrode.

This modulation device array of an embodiment of the invention has a memory circuit. The provision of such a memory circuit enables the preliminary writing of a deviced is placement signal to this memory circuit. Further, a constant common voltage is applied to the common electrode, similarly to a related art array. Simultaneously, the device displacement preliminarily written to the memory circuit is applied to the signal electrode. Thus, the plural modulation devices can be actively driven at a high speed.

(12). The microelectromechanical modulation device array according to (10) or (11), wherein the modulation device further comprising:

a control portion adapted to modulation-drive each of said movable portions.

According to an embodiment of this modulation device array of the invention, the movable portion is drive-controlled by the control portion. Thus, before the movable portion reaches the final displacement position, the reduction, or increase, or increase/decrease of the absolute value of the interelectrode voltage between the movable electrode and the fixed electrode is performed. This enables the suppression of oscillation due to a collision, which would be caused when the movable portion of the related device reached the final displacement position at a high speed, and also enables suppression of an overshoot.

(13). An image forming apparatus comprising:

a light source;

the microelectromechanical modulation device array according to any one of (10) to (12);

an illuminating optical system adapted to irradiate light, which is outputted from said light source, onto said microelectromechanical modulation device array; and a projection optical system adapted to project light, which is outputted from said microelectromechanical modulation device array, onto an image forming surface.

This image forming apparatus of one embodiment of the invention has one of the modulation device arrays according to any one of (10) to (12) as a primary part. Thus, the oscillation of the movable portion can be actively reduced. The driving cycle can be reduced, as compared with a related art apparatus. This enables high-speed exposure of a photosensitive material, and display in a higher-pixel projector. Further, an image forming apparatus (or an exposure apparatus) adapted to perform gradation control by switching on/off of exposing light can reduce anon/off time. Thus, higher gradation can be realized.

The microelectromechanical modulation device according to the invention has a plurality of drive sources operative to apply a physical action force to the movable portion. When the movable portion is displacement-driven in a first direction, a physical action force for suppressing the oscillation of the movable portion is applied to the movable portion by the drive sources while the movable portion is transited in the first direction. Thus, a physical attraction force is exerted in a direction opposite to the direction of transition of the movable portion. The oscillation of the movable portion, which is caused when the movable portion is put into contact with a stopping member, can be actively reduced. Consequently, the speeding-up of a switching operation of the microelectromechanical modulation device can be achieved.

In accordance with the microelectromechanical modulation device array according to the invention, after the movable portion reaches the final displacement position, the oscillation of the movable portion is suppressed. Therefore, an oscillation stopping time can be eliminated or can be considerably reduced. The writing of address voltages can be performed without necessity for waiting for the stop of the oscillation. Consequently, the speeding-up of a switching operation can be achieved by reducing a driving cycle.

The image forming apparatus according to the invention has a light source, the microelectromechanical modulation device array according to any one of (10) to (12), an illuminating optical system adapted to irradiating light, which is outputted from the light source, onto the the microelectromechanical modulation device array, and a projection optical system adapted to project light, which is outputted from the microelectromechanical modulation device array, onto an image forming surface. Thus, as compared with a related art apparatus, the length of time required to perform a switching operation can be reduced. This enables high-speed exposure of a photosensitive material, and display in a higher-pixel projector.

BRIEF DESCRIPTION OF THE DRAWINGS

FIGS. 10A to 10C are explanatory views illustrating a seventh modification in which the driving voltage Va is reduced at predetermined intervals.

FIGS. 11A to 11C are explanatory views illustrating an eighth modification in which a constant voltage is applied after a pulse waveform is applied.

FIGS. 12A to 12C are explanatory views illustrating a ninth modification in which a constant voltage is applied after a plurality of pulse waveforms are applied.

FIGS. 13A to 13C are explanatory views illustrating a tenth modification in which a constant voltage is applied before a pulse waveform is applied.

DETAILED DESCRIPTION OF THE INVENTION

Hereinafter, preferred embodiments of a microelectromechanical modulation device, a microelectromechanical modulation device array, and an image forming apparatus according to the invention are described with reference to the accompanying drawings.

Figure 1:
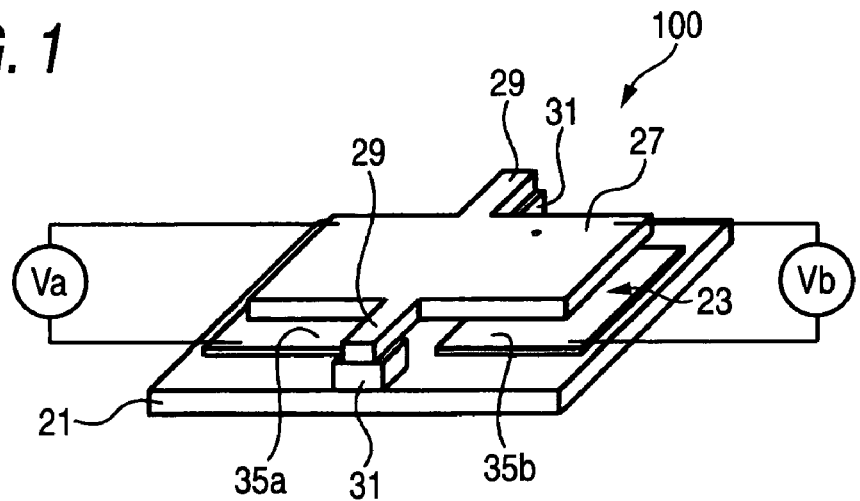
FIG. 1 is a conceptual view illustrating a first embodiment of a microelectromechanical modulation device according to the invention.
Figure 2A:
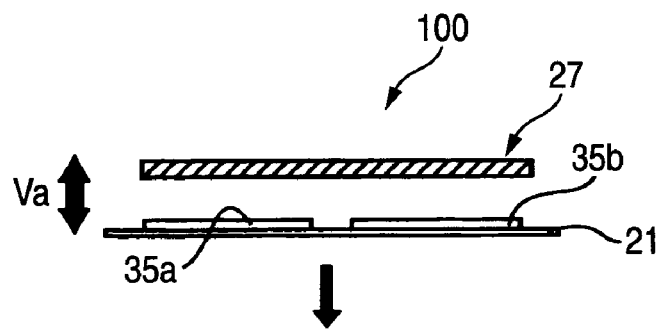
FIGS. 2A to 2C are operation explanatory views illustrating a damping process of the microelectromechanical modulation device shown in FIG. 1.
Figure 2B:
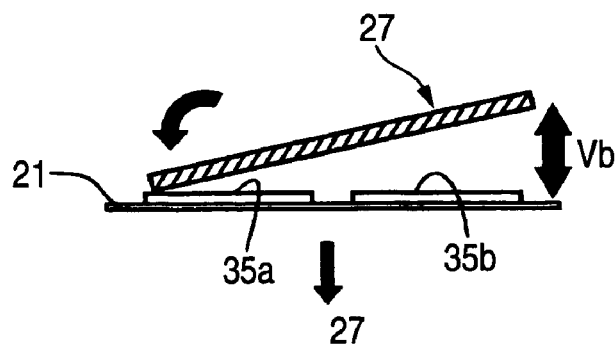
Figure 2C:
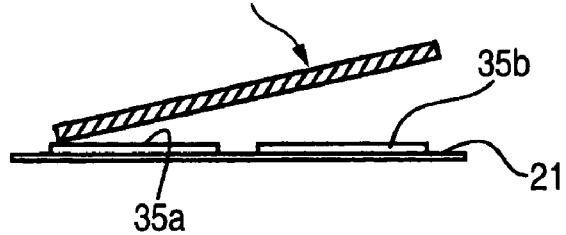
Figure 3A:
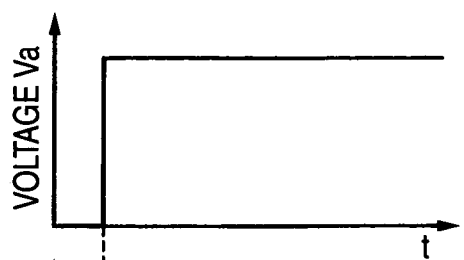
FIGS. 3A to 3C are explanatory views illustrating a behavior of a movable portion to which a pulse waveform is applied.
Figure 3B:
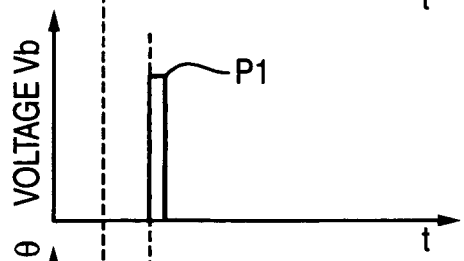
Figure 3C:
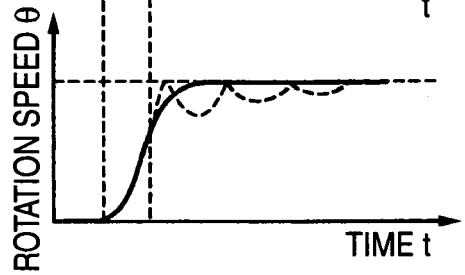

FIG. 1 is a conceptual view illustrating a first embodiment of a microelectromechanical modulation device according to the invention. FIGS. 2A to 2C are operation explanatory views illustrating a damping process of the microelectromechanical modulation device shown in FIG. 1. FIGS. 3A to 3C are explanatory views illustrating a behavior of a movable portion to which a pulse waveform is applied.

The microelectromechanical modulation device (hereunder also referred to simply as a "modulation device") 100 according to this embodiment includes a substrate 21, a small-piece-like movable portion disposed in parallel to the substrate 21 through a gap 23, hinges 29, 29 respectively extended from both edge parts of the movable portion 27, and spacers 31, 31 supporting the movable portion 27 on the substrate 21 through these hinges 29, 29, as fundamental components. By this configuration, the movable part is capable of being rotated and transited by the distortion of the hinges 29, 29.

When the modulation device 100 is used in, for example, a DMD, the movable portion 27 serves as a light reflector (or a mirror portion). Additionally, the modulation device can modulate sound waves, fluids, and heat waves by preferably selecting the material of the movable portion 27.

When the modulation device 100 is used as a light modulation device, the movable portion 27 serves as a light reflector (or mirror portion) and performs light modulation by deflection. However, the present invention is not limited thereto, this modulation method enables light modulation through other type or system of light modulation device by appropriately adopting structure or materials of the movable portion 27. The Examples of the device include a transmission type, a shutter system, an interference system, a diffraction system, and a total reflection system.

In this embodiment, the movable portion 27 is stopped by being put into contact with a stopping member (not shown) when reaching at a final position of displacement in a specific direction. That is, this embodiment constitutes a contact type modulation device.

Therefore, when reaching the final position, the movable portion 27 is put into contact with the stopping member (what is called, a landing site) and is then stopped.

A first address electrode 35a and a second address electrode 35b are provided on both sides of the hinges 29, 29 on the central part of the top surface of the substrate 21. Also, a movable electrode (not shown) is provided on a part of the movable portion 27. The modulation device 100 applies a voltage to each of the first address electrode 35a, the second address electrode 35b, and the movable portion 27 as a fundamental operation. Thus, the movable portion 27 is swung and displaced. That is, in a case where the movable portion 27 is a mirror portion, the direction of reflection of light is deflected.

When a difference in potential is given between the movable portion 27 and each of the first address electrode 35a and the second address electrode 35b in the modulation device 100, an electrostatic force is generated between the movable portion 27 and each of the electrodes, so that torque acts around each of the hinges 29, 29. The electrostatic force generated at that time depends upon a vacuum dielectric constant, the area of the movable portion 27, an applied voltage, and the distance between the movable portion 27 and each of the address electrodes.

Therefore, in a case where the vacuum dielectric constant, the area of the movable portion 27, the distance between the movable portion 27 and each of the address electrodes, and the elastic coefficient of the hinges 29, 29 are constant, the movable portion 27 can be rotation-displaced sideways by controlling the potential at each of the electrodes. For instance, in a case where Va>Vb, the magnitude of the electrostatic force generated between the first address electrode 35a and the movable portion 27 is larger than that of the electrostatic force generated between the second address electrode 35b and the movable portion 27, so that the movable portion 27 is leftwardly inclined, as viewed in the figure. Conversely, in a case where Va<Vb, the magnitude of the electrostatic force generated between the second address electrode 35b and the movable portion 27 is larger than that of the electrostatic force generated between the first address electrode 35a and the movable portion 27, so that the movable portion 27 is rightwardly inclined, as viewed in the figure.

Thus, the movable electrode of the movable portion 27, the first address electrode 35a and the second address electrode 35b serve as a drive source for rotation-displacing the movable portion 27. A physical action force applied from such a drive source to the movable portion 27 is an electrostatic force to thereby enable high-speed rotation-displacement.

Incidentally, the physical action force acting upon the movable portion 27 may be a physical action force other than an electrostatic force. For instance, a force due to the effect of a piezoelectric device and an electromagnetic force are cited as the physical action force other than an electrostatic force. In this case, a piezoelectric actuator, which uses a piezoelectric device, and an electromagnetic actuator, which uses a magnet coil, are employed as the drive sources.

The modulation device 100 has the movable portion 28 that are bidirectionally displaced. This movable portion 27 has the modulation function. The movable portion 27 is rotation-displaced by a plurality of drive sources (the movable electrode of the movable portion 27, the first address electrode 35a, and the second address electrode 35b). Incidentally, the modulation device 100 is adapted so that when the movable portion 27 is displacement-driven in the leftward direction (corresponding to the first direction) shown in FIG. 1, a physical action force for suppressing the oscillation of the movable portion 27 is applied to the movable portion 27 by the drive sources in a second direction, which differs from the first direction) during the movable portion 27 is transited in the first direction.

As shown in FIG. 2A, first, the driving voltage Va is applied to the first address electrode -35a placed in an anti clockwise direction. Subsequently, as shown in FIG. 2B, the oscillation suppressing voltage Vb is applied to the second address electrode 35b immediately before the left end of the movable portion 27 touches the stopping member. Consequently, as shown in FIG. 2C, an electrostatic force is generated between the movable portion 27 and the second address electrode 35b by the oscillation suppressing voltage Vb. This electrostatic force attracts the right end of the movable portion 27 to the substrate 21. This electrostatic force has an oscillation absorbing effect. Thus, the movable portion 27 stops simultaneously with the contact between the movable portion 27 and the stopping member.

Thus, when the movable portion 27 reaches the final position of the displacement in the specific direction, the speed of the movable portion 27 is substantially zero at that moment. This prevents occurrence of oscillation due to a collision, which would be caused when the movable portion of the related device reached the final displacement position at a high speed.

Further, when reaching the final position, the movable portion 27 touches the stopping member (or the landing site).

Immediately after touching the stopping member, the movable portion 27 receives a reaction force from the stopping member. However, the movable portion 27 is braked by the electrostatic attracting force, and is forcibly damped. Additionally, because the physical action force having the oscillation absorbing effect is an electrostatic force, a high-speed oscillation suppressing force can be obtained.

Moreover, the physical action force is exerted onto a plurality of points of action of the movable portion 27 (in this embodiment, the left-side point and the right-side point of the movable portion 27). Thus, for example, a swing type movable portion 27, whose center serves as the center of rotation thereof, is adapted so that the physical action force is applied to both sides of the center of rotation. Consequently, damping forces respectively having different magnitudes can be applied to the points of action at different moments. Thus, various damping effects can be obtained.

An oscillation suppressing voltage Vb for generating an electrostatic attracting force, that is, a voltage applied between the movable portion 27 and the second address electrode 35*b* can be set to have a pulse waveform illustrated in FIG. 3B whose ordinates represent the magnitude of the voltage and whose abscissas represent time. In this example, just before the movable portion 27 touches the stopping member, one "backward pulse waveform" p1 is applied. Hereunder, a pulse waveform to be applied as the waveform of a signal representing an oscillation suppressing voltage Vb between the movable portion 27 and the second address electrode 35*b* is referred to as a "backward pulse wave". Further, a pulse waveform to be applied as the waveform of a signal representing a driving voltage Va between the movable portion 27 and the first address electrode 35*a* is referred to as a "forward pulse wave".

The waveform of a signal representing the oscillation suppressing voltage Vb is set to be such a pulse waveform. Thus, the electrostatic attracting force is generated within a range specified by the pulse waveform. Consequently, various damping effects are obtained. Incidentally, the pulse waveform includes the waveforms of a rectangular wave, a sinusoidal wave, a cosine wave, a saw tooth wave, a triangular wave, and waves synthesized from these waves.

This modulation device 100 is adapted so that during the transition of the movable portion 27 before reaching the final displacement position, a physical attracting force acts in a direction opposite to the direction of the transition, and that the speed of the movable portion 27 is reduced just before the movable portion 27 reaches the final displacement position. This suppresses occurrence of oscillation due to a collision, which would be caused when the movable portion of the related device reached the final displacement position at a high speed, and also suppresses occurrence of an overshoot, which would be caused when the movable portion of the related device reached the final displacement position during the noncontact driving thereof. That is, the oscillation of the movable portion 27, which is caused when the movable portion is put into contact with a stopping member, can be actively reduced.

Next, various modifications of the pulse waveforms applied by being superimposed on the oscillation suppressing voltage Vb and the driving voltage Va so as to generate the electrostatic attracting force having the oscillation absorbing effect.

Figure 4A:
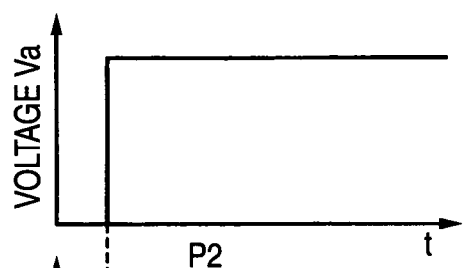
FIGS. 4A to 4C are explanatory views illustrating a first modification to which two rectangular pulse waveforms are applied.
Figure 4B:
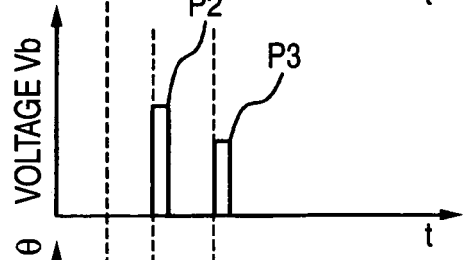
Figure 4C:
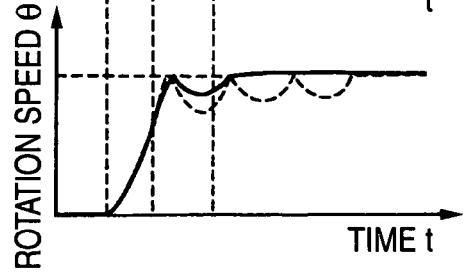

FIGS. 4A to 4C are explanatory views illustrating a first modification to which two rectangular pulse waveforms are applied.

Incidentally, in the descriptions of the following embodiments and modifications, like reference characters designate like members or parts. The duplicate description of such members or parts is omitted herein.

This modification is adapted to apply a plurality of "backward pulse waveforms" P2 and P3 just before the movable portion 27 touches the stopping member. Although two pulse waveforms P2 and P3 are illustrated in FIGS. 4A to 4C, three or more pulse waveforms may be applied.

According to this modification, electrostatic attracting forces respectively serving as physical action forces and having different magnitudes can be applied to the points of action at different moments. Thus, various damping effects can be obtained.

Figure 5A:
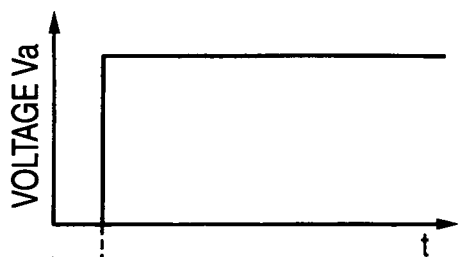
FIGS. 5A to 5C are explanatory views illustrating a second modification to which a triangular pulse waveform is applied.
Figure 5B:
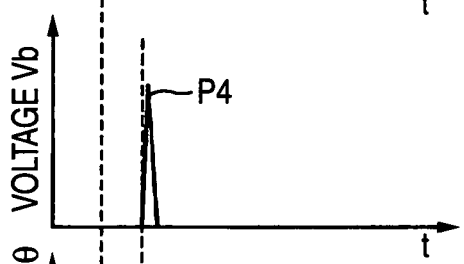
Figure 5C:
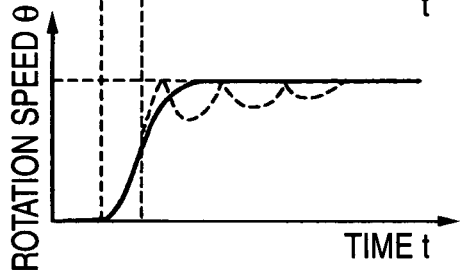

FIGS. 5A to 5C are explanatory views illustrating a second modification to which a triangular pulse waveform is applied.

In this modification, the pulse wave P4 is a triangular wave. Thus, the pulse wave may be a triangular wave, a sinusoidal wave, or the like.

According to this modification, an electrostatic attracting force serving as a physical action force is applied with abrupt timing with which a rectangular wave cannot be provided.

Figure 6A:
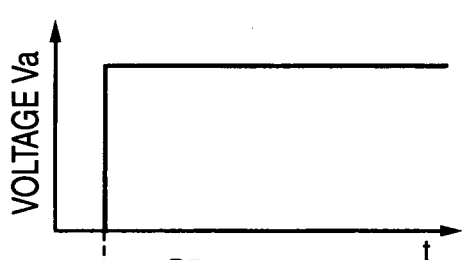
FIGS. 6A to 6C are explanatory views illustrating a third modification to which two triangular pulse waveforms are applied.
Figure 6B:
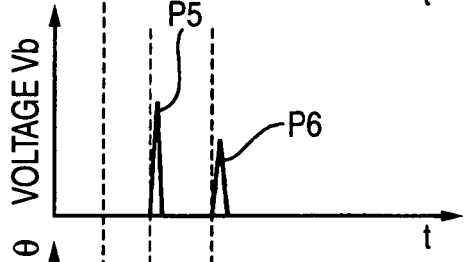
Figure 6C:
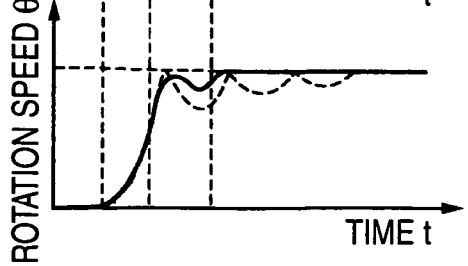

FIGS. 6A to 6C are explanatory views illustrating a third modification to which two triangular pulse waveforms are applied.

This modification is adapted so that plural backward triangular pulse waves P5 and P6 are applied immediately before the movable portion 27 touches the stopping member. Although two pulse waveforms P5 and P6 are illustrated in FIGS. 6A to 6C, three or more pulse waveforms may be applied.

According to this modification, electrostatic attracting forces respectively having steep waveforms and different magnitudes can be applied at different moments.

Figure 7A:
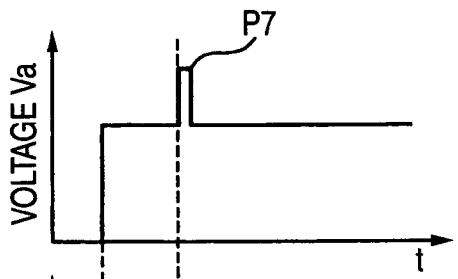
FIGS. 7A to 7C are explanatory views illustrating a fourth modification in which a pulse waveform is applied by being superimposed on a driving voltage Va.
Figure 7B:
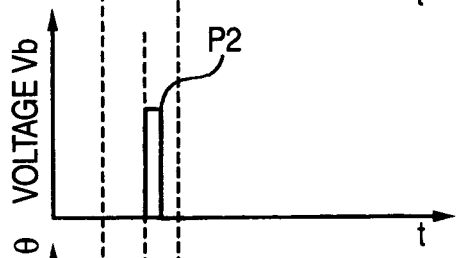
Figure 7C:
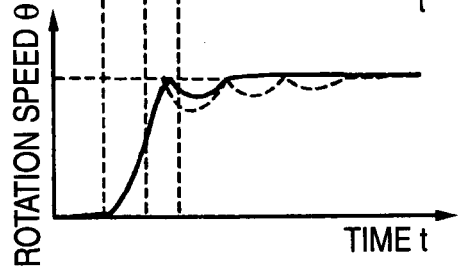

FIGS. 7A to 7C are explanatory views illustrating a fourth modification in which a pulse waveform is applied by being superimposed on a driving voltage Va.

This modification is adapted so that after a backward pulse wave P2 is applied just before the movable portion 27 touches the stopping member, the movable portion 27 touches the stopping member, and that subsequently, when the movable portion 27 is detached by a reaction force from the stopping member, a forward pulse wave P7 is applied by being superimposed on the driving voltage Va. That is, after the movable portion 27 is displacement-driven in a counterclockwise direction (corresponding to a first direction), a physical action force is applied to the movable portion 27 in the first direction by the drive sources (that is, the first address electrode 35*a* and the movable portion 27) during the movable portion 27 is transited in a clockwise direction (corresponding to a second direction).

According to this modification, the movable portion 27 is displacement-driven in the first direction. After the movable portion 27 reaches the final position, a physical action force acting in the first direction is exerted on the movable portion 27 during the movable portion 27 is transited in the second direction by a reaction force or an elastic force caused when the movable portion 27 abuts against the stopping member. Thus, when departing from the final displacement position, the movement of the movable portion 27 is actively braked.

Figure 8A:
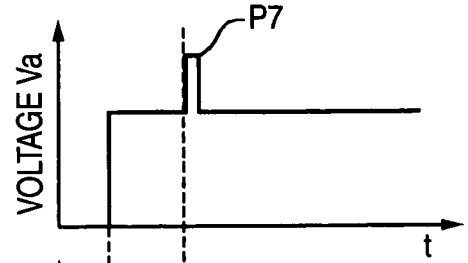
FIGS. 8A to 8C are explanatory views illustrating a fifth modification in which a pulse waveform is applied to a damping electrode after a pulse waveform is applied by being superimposed on the driving voltage Va.
Figure 8B:
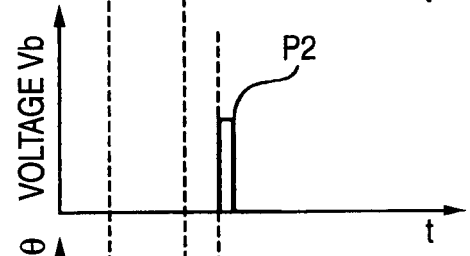
Figure 8C:
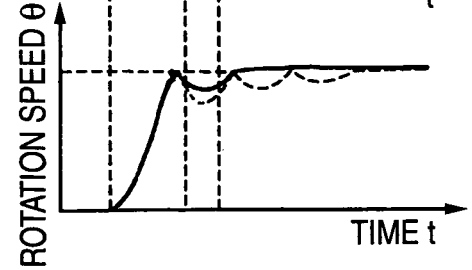

FIGS. 8A to 8C are explanatory views illustrating a fifth modification in which a pulse waveform is applied to a damping electrode after a pulse waveform is applied by being superimposed on the driving voltage Va.

This modification is adapted so that the backward pulse wave P2 and the forward pulse wave 7 are applied in order opposite to the order in which these pulse waves are applied in the modification illustrated in FIGS. 7A to 7C. That is, immediately after the movable portion 27 touches the stopping member and is detached therefrom, the forward pulse wave P7 is applied. Subsequently, the backward pulse wave P2 is applied just before the movable portion 27 touches the stopping member again.

According to this modification, after the movable portion 27 reaches the final displacement position, a physical action force acting in the first direction is exerted on the movable portion 27 during the movable portion 27 is transited in the second direction by a reaction force or an elastic force caused when the movable portion 27 abuts against the stopping member. Thus, when departing from the final displacement position, the movement of the movable portion 27 is actively braked. Further, just before the movable portion 27, which cannot be caused by the braking to stand still, touches the stopping member again, the backward pulse wave P2 is applied, so that the movable portion 27 surely comes to a standstill.

Figure 9A:
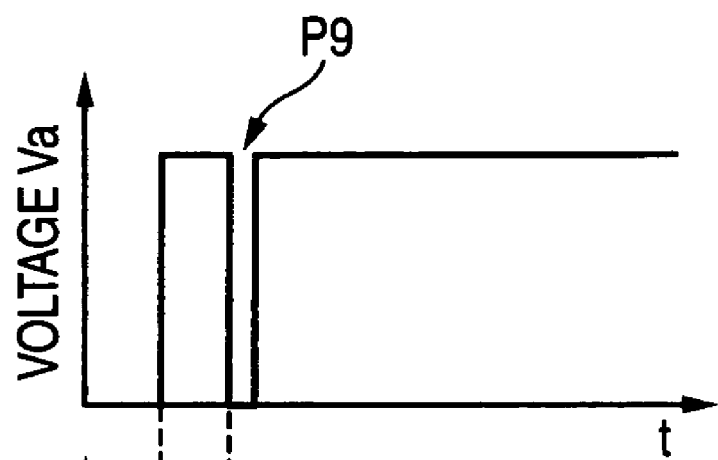
FIGS. 9A to 9C are explanatory views illustrating a sixth modification in which the driving voltage Va is reduced in a predetermined interval.
Figure 9B:
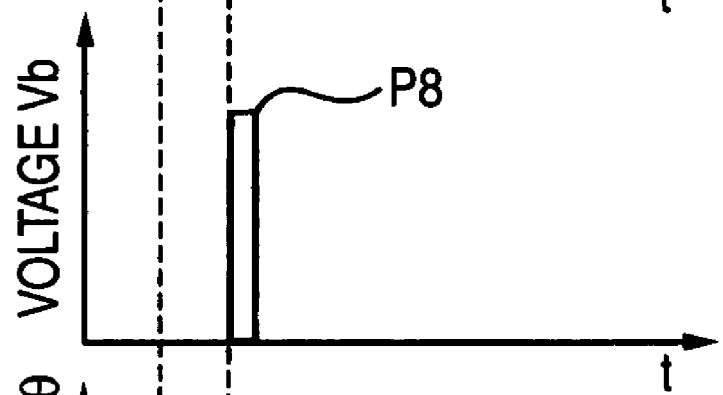
Figure 9C:
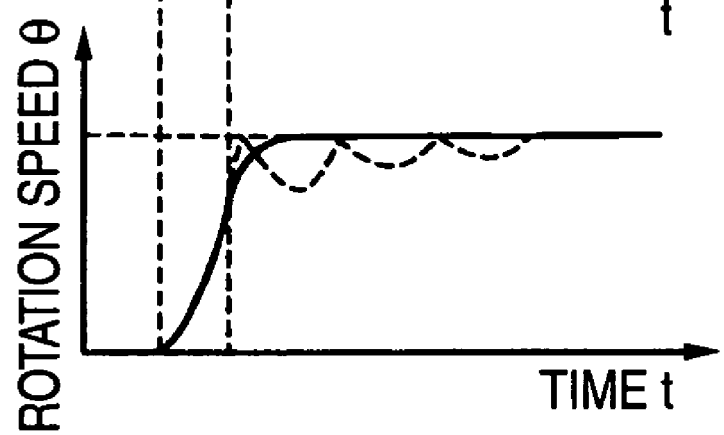

FIGS. 9A to 9C are explanatory views illustrating a sixth modification in which the driving voltage Va is reduced in a predetermined interval.

This modification is adapted so that the backward pulse wave P8 is applied just before the movable portion 27 touches the stopping member, and that simultaneously with this, the pulse wave P9, whose voltage level is lowered, is applied.

According to this modification, the movable portion 27 is braked by the backward pulse wave P8 immediately before the movable portion 27 touches the stopping member. At that time, the driving voltage Va is canceled by the pulse wave P9. Thus, the movable portion 27 is braked by a force having a larger magnitude. Incidentally, although the voltage level of the pulse wave P9 is reduced to 0V in this case, the drop of the voltage level of the forward pulse wave P9 may differ from 0V.

FIGS. 10A to 10C are explanatory views illustrating a seventh modification in which the driving voltage Va is reduced at predetermined intervals.

This modification is adapted so that forward pulse waves P9 and P10, which lower the voltage levels thereof, are applied, simultaneously with the application of a plurality of backward pulse waves P2 and P3.

According to this modification, the operation of the modification illustrated in FIGS. 9A to 9C is repeated, so that the movable portion 27 is more surely braked.

FIGS. 11A to 11C are explanatory views illustrating an eighth modification in which a constant voltage is applied after a pulse waveform is applied.

This modification is adapted so that a backward pulse wave P1 is applied just before the movable portion 27 touches the stopping member, and that thereafter, a constant voltage Vb1 is kept applied. That is, the normal voltage level of the backward pulse wave is not necessarily set to be 0V.

According to this modification, the movable portion is backwardly biased after touching the stopping member. Thus, the movable portion 27 can be driven at a small difference in potential.

FIGS. 12A to 12C are explanatory views illustrating a ninth modification in which a constant voltage is applied after a plurality of pulse waveforms are applied.

This modification is adapted so that a constant voltage Vb1 is kept applied during and after plural backward pulse waves P2 and P3 are applied just before the movable portion 27 touches the stopping member.

According to this modification, the oscillation absorbing effect can reliably be obtained. Also, the movable portion 27 can be driven at a small difference in potential.

FIGS. 13A to 13C are explanatory views illustrating a tenth modification in which a constant voltage is applied before a pulse waveform is applied.

This modification is adapted so that a backward pulse wave P1 is applied just before the movable portion 27 touches the stopping member, that subsequently, a constant voltage Vb1 is kept applied, and that even before the backward pulse wave P1 is applied, the constant voltage Vb1 is applied as the oscillation suppressing voltage Vb.

According to this modification, the movable portion 27 is always backwardly biased, so that the drive portion 27 can be driven at a small difference in potential. The oscillation of the movable portion 27 is caused at all times during counterbalancing between the forward and backward electrostatic forces. In the case of the contact type device, as long as a backward voltage is within a range that allows the movable portion 27 to maintain a contact state by being-pulled-in, such a backward voltage can be always applied without problems.

Thus, the aforementioned microelectromechanical modulation device has a plurality of drive sources that exert physical action forces to the movable portion 27. When the movable portion 27 is displacement-driven in the first direction by the drive sources, the physical action force is applied by the drive sources in the second direction, which differs from the first direction, to the movable portion 27 during the movable portion 27 is transited in the first direction. Consequently, a physical attracting force can be exerted in a direction opposite to the direction of transition of the movable portion 27. Further, the oscillation of the movable portion 27, which is caused when the movable portion 27 touches the stopping member, can be actively reduced. Consequently, the speeding-up of the switching operation in the modulation device 100 can be achieved.

Next, a second embodiment of the microelectromechanical device according to the invention is described hereinbelow.

Figure 14:
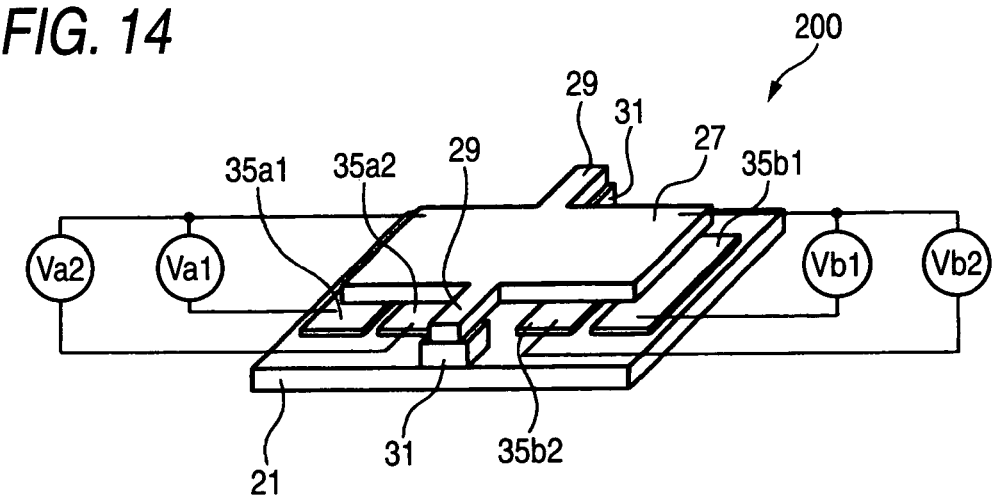
FIG. 14 is a conceptual view illustrating a second embodiment of the microelectromechanical modulation device according to the invention.

FIG. 14 is a conceptual view illustrating the second embodiment of the microelectromechanical modulation device according to the invention.

A modulation device 200 according to this embodiment is configured so that two or more physical action forces can be set corresponding to the direction of transition of the movable portion 27. That is, a set of a main first address electrode 35$a$1, and an auxiliary first address electrode 35$a$2, and another set of a main second address electrode 35$a$1 and an auxiliary second address electrode 35$b$2 are provided on both sides of the hinges 29, 29 on the central part of the top surface of the substrate 21. A driving voltage Va1 is applied between the main first address electrode 35$a$1 and the movable portion 27, while a driving voltage Va2 is applied between the auxiliary first address electrode 35$a$2 and the movable portion 27. Further, an oscillation suppressing voltage Vb1 is applied between a main second address electrode 35$b$1 and the movable portion 27, while another oscillation suppressing voltage Vb2 is applied between an auxiliary second address electrode 35$b$2 and the movable portion 27.

According to this modulation device 200, in the swing type movable portion 27, whose center serves as the center of rotation thereof, is adapted so that two or more physical action forces are applied to each of both sides of the center of rotation.

Consequently, different damping forces respectively having different magnitudes can be applied to each of the sides of the movable portion 27 at different moments. Thus, various damping effects can be obtained.

Next, a third embodiment of the microelectromechanical device according to the invention is described hereinbelow.

Figure 15:
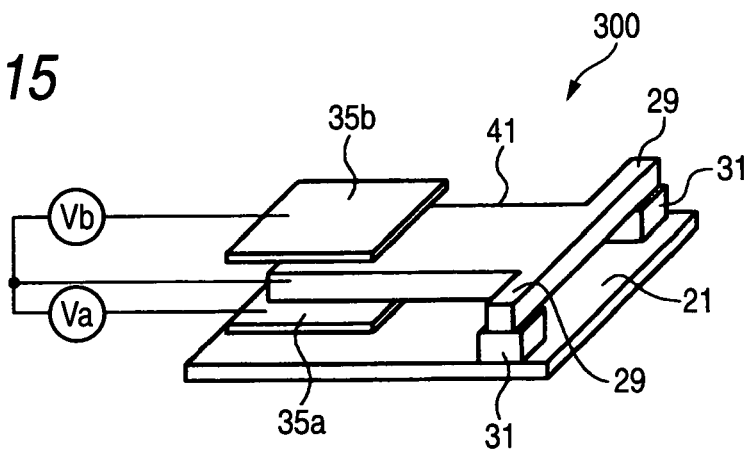
FIG. 15 is a conceptual view illustrating a third embodiment of the microelectromechanical modulation device according to the invention.

FIG. 15 is a conceptual view illustrating a third embodiment of the microelectromechanical modulation device according to the invention.

A modulation device 300 according to this embodiment is configured so that one of ends of a movable portion 41 is supported by and is fixed to the substrate 21 through the hinges 29, 29 and spacers 31, 31. That is, the movable portion 41 is configured like a cantilever, so that the other end of the movable portion 41 is a free end. Further, a first address electrode 35a facing the free end of the movable portion 41 is provided on the substrate 21. A second address electrode 35b to be formed on an opposed substrate (not shown) is provided on the side opposite to the first address electrode 35a so that the movable portion 41 is sandwiched between the first address electrode 35a and the second address electrode 35b.

Even in the modulation device 300 having this configuration, a drive voltage Va is applied between the first address electrode 35a and the movable portion 41, while an oscillation suppressing voltage is applied between the second address electrode 35b and the movable portion 41. Thus, during the transition of the movable portion 27 before the movable portion 27 reaches the final displacement position (in this case, the stopping member at the side of the first address electrode 35a), an electrostatic attracting force is caused to act in a direction opposite to the direction of the transition. Thus, the speed of the movable portion 41 is reduced just before the movable portion reaches the final displacement position.

This suppresses occurrence of oscillation due to a collision, which would be caused when the movable portion of the related device reached the final displacement position at a high speed. That is, the oscillation of the movable portion 27, which is caused when the movable portion is put into contact with the stopping member, can be actively reduced.

Next, a fourth embodiment of the microelectromechanical device according to the invention is described hereinbelow.

Figure 16:
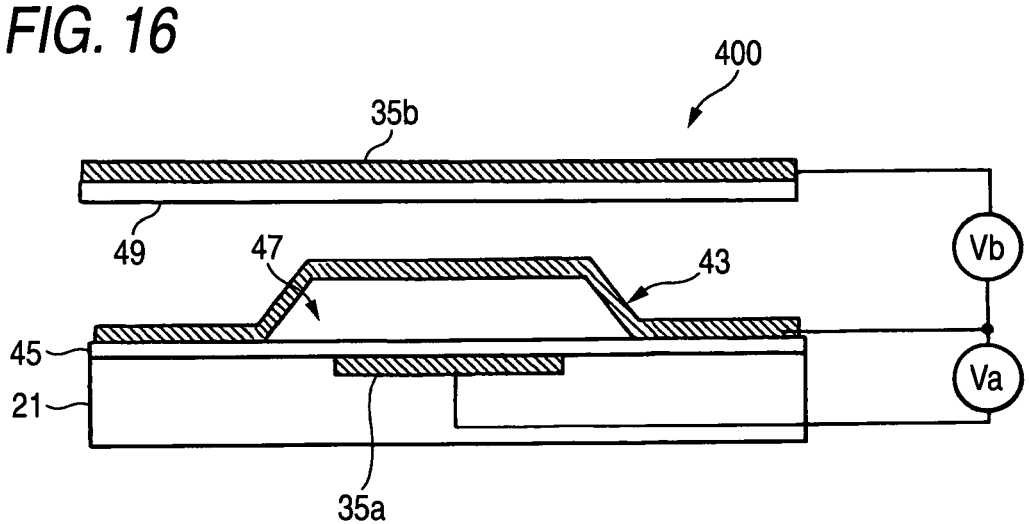
FIG. 16 is a conceptual view illustrating a fourth embodiment of the microelectromechanical modulation device according to the invention.

FIG. 16 is a conceptual view illustrating a fourth embodiment of the microelectromechanical modulation device according to the invention.

A modulation device 400 according to this embodiment is what is called a parallel plate type device. Both ends of the flat-plate-like movable portion 43 having both electrical conductivity and flexibility are connected to an insulating film 45 formed on this substrate 21 so that a predetermined gap 47 is provided between movable portion 43 and the insulating from 45. A first address electrode 35a is disposed below the movable portion 43 through the insulating film 45. A second address electrode 35b is disposed above the movable portion 43 through the insulating film 45. That is, the movable portion 43 is configured like a center impeller type beam supported at both ends thereof between the first address electrode 35a and the second address electrode 35b.

In such a parallel plate type modulation device 400, a driving voltage Va is applied between the first address electrode 35a and the movable portion 43, while an oscillation suppressing voltage is applied between the second address electrode 35b and the movable portion 43. Thus, during the transition of the movable portion 43 before the movable portion 43 reaches the final displacement position (in this case, the stopping member at the side of the first address electrode 35a), an electrostatic attracting force is caused to act in a direction opposite to the direction of the transition. Consequently, the speed of the movable portion 43 is reduced just before the movable portion 43 reaches the final displacement position.

Further, the configuration of the modulation device according to the invention is not limited to that of each of the modulation devices according to the aforementioned embodiments. The direction, structure, and driving of the modulation device maybe optional. The invention can be applied to all modulation devices that are bidirectionally driven.

Next, results of simulation performed on the modulation device having the configuration of the first embodiment are described hereinbelow.

Figure 17A:
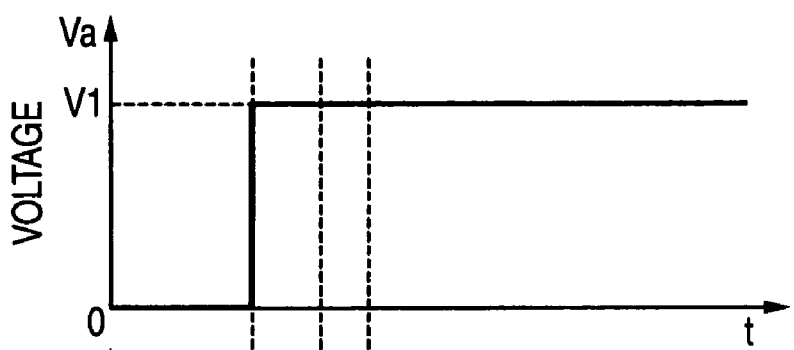
FIGS. 17A to 17C are explanatory views illustrating the checking of operations of a microelectromechanical modulation device, whose configuration is equivalent to that of the first embodiment, in a case of utilizing simulation.
Figure 17B:
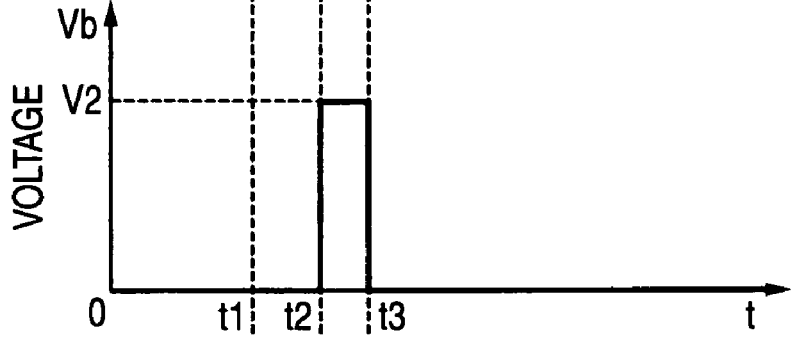
Figure 17C:
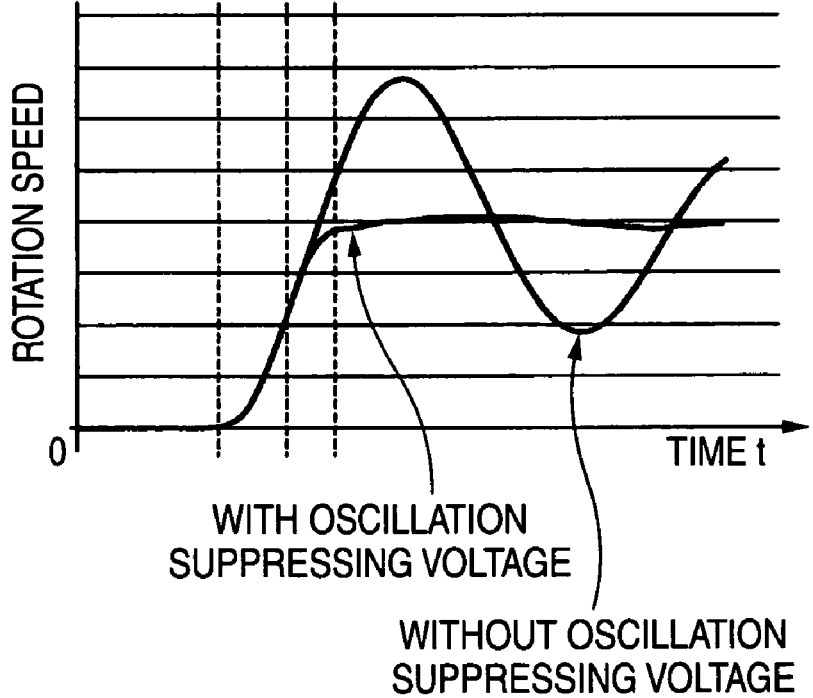

FIGS. 17A to 17C are explanatory views illustrating the checking of operations of a microelectromechanical modulation device, whose configuration is equivalent to that of the first embodiment, in a case of utilizing simulation.

The oscillation of the movable portion, which was caused after the transition thereof, in a rotating hinge type micromachine device shown in FIG. 1 was analyzed by setting a forward electric potential difference and a backward electric potential difference at Va and Vb, respectively.

Results of this analysis reveal that the movable portion largely oscillated in a case where the potential difference Va=V1 was applied after the lapse of time t1, and that the oscillation of the movable portion was suppressed in a case where the potential difference Va=V1 was applied after the lapse of time t1 and where the potential difference Vb=V2 was applied between a moment t2 and a moment t3.

Next, results of manufacturing a modulation device, which has the configuration of the first embodiment, and actually operating the manufactured modulation device are described hereinbelow.

Figure 18A:
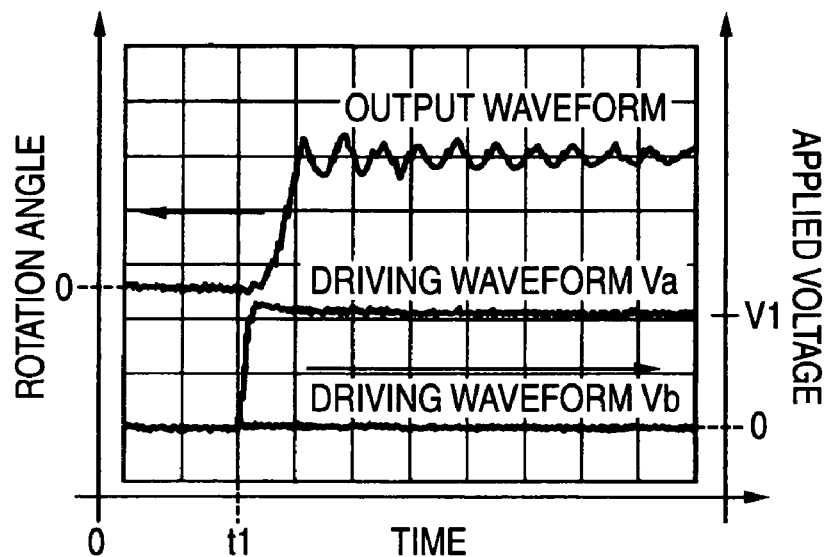
FIGS. 18A and 18B are explanatory views illustrating the checking of operations of a microelectromechanical modulation device, whose configuration is equivalent to that of the first embodiment, in a case of actually manufacturing this device.
Figure 18B:
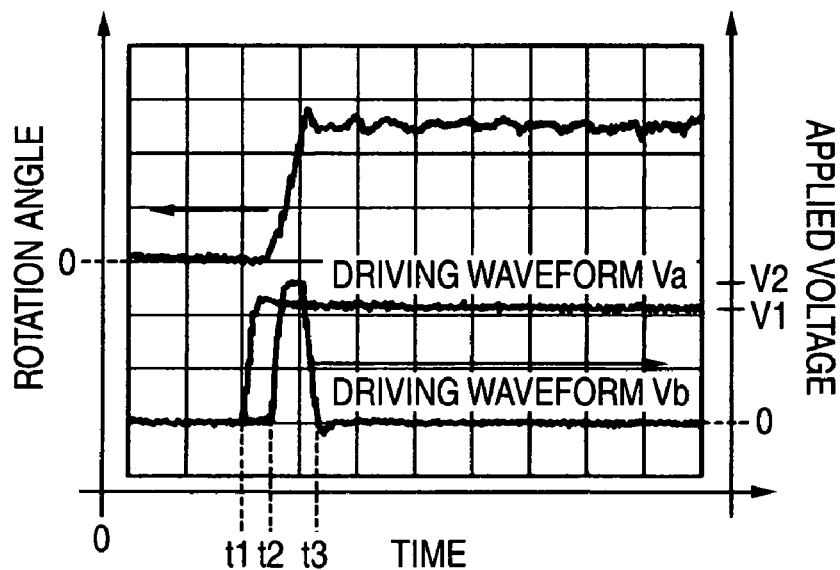

FIGS. 18A and 18B are explanatory views illustrating the checking of operations of the microelectromechanical modulation device, whose configuration is equivalent to that of the first embodiment, in the case of actually manufacturing this device.

The oscillation of the movable portion, which was caused after the transition thereof, in a real rotating hinge type micromachine device shown in FIG. 1 was analyzed by setting a forward electric potential difference and a backward electric potential difference at Va and Vb, respectively.

Results of this analysis reveal that as shown in FIG. 18A, the movable portion largely oscillated in a case where the potential difference Va=V1 was applied after the lapse of time t1, and that as shown in FIG. 18B, the oscillation of the movable portion was suppressed in a case where the potential difference Va=V1 was applied after the lapse of time t1 and where the potential difference Vb=V2 was applied between a moment t2 and a moment t3 (incidentally, a delay in an input waveform occurred due to the performance limit of a function generator).

Figure 19A:
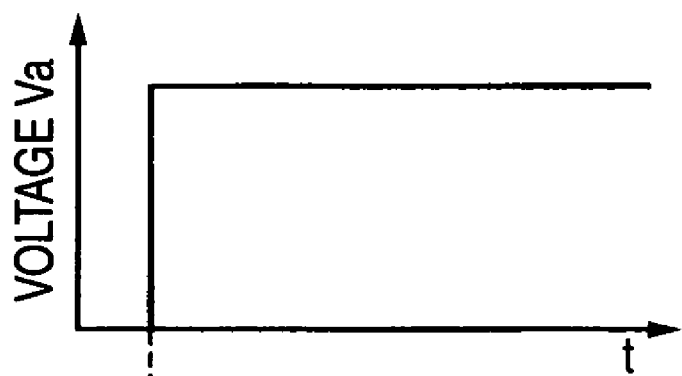
FIGS. 19A to 19C are explanatory views illustrating the behavior of a movable portion in a case where the invention is applied to a noncontact type microelectromechanical modulation device.
Figure 19B:
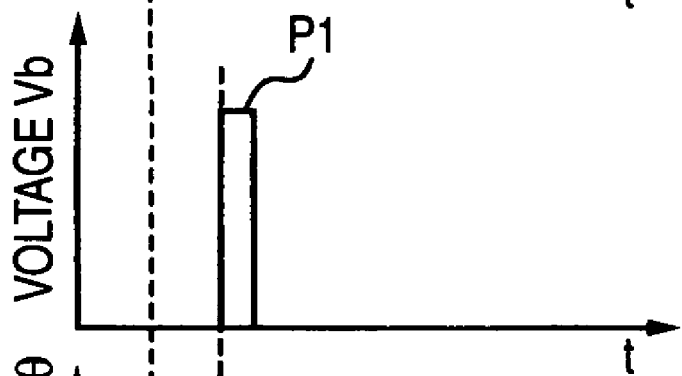
Figure 19C:
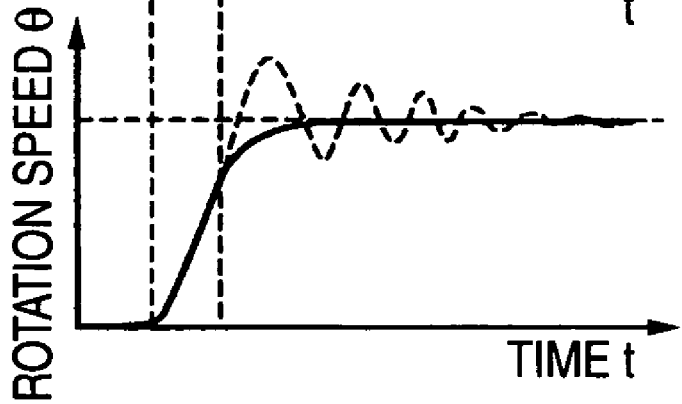

FIGS. 19A to 19C are explanatory views illustrating the behavior of a movable portion in a case where the invention is applied to a noncontact type microelectromechanical modulation device.

Although the foregoing description of the embodiments and the modifications has described the case where the modulation device is of the contact type, the invention can obtain advantages similar to those of the embodiments and the modifications even when applied to a modulation device of the noncontact type.

That is, when the movable portion 27 is displacement-driven in the first direction by the drive sources, a physical action force is applied by the drive sources in the second direction, which differs from the first direction, to the movable portion 27 by applying a pulse wave P1 during the movable portion 27 is transited in the first direction. Thus, a physical attracting force can be exerted in a direction opposite to the direction of transition of the movable portion 27, so that an overshoot of the movable portion 27 can be actively reduced. Consequently, the speeding-up of the switching operation in the noncontact-driven modulation device 100 can be achieved.

A microelectromechanical modulation device array (hereunder referred to simply as a "modulation device array") can be configured by one-dimensionally or two-dimensionally arranging the modulation devices 100, 200, or 300 disclosed in the descriptions of the embodiments.

In the case of such a modulation device array, the modulation devices 100, 200, or 300 enabled to perform high-speed switching operations are formed into an array. This enables the reduction of an oscillation stopping time. Consequently, the writing of address voltages can be performed earlier, as compared with a related array.

Thus, after the movable portion reaches the final displacement position, the oscillation of the movable portion can be suppressed. The oscillation stopping time can be eliminated or can be considerably reduced. The writing of address voltages can be performed without necessity for waiting for the stop of the oscillation. Consequently, the speeding-up of a switching operation can be achieved by reducing a driving cycle.

Figure 20:
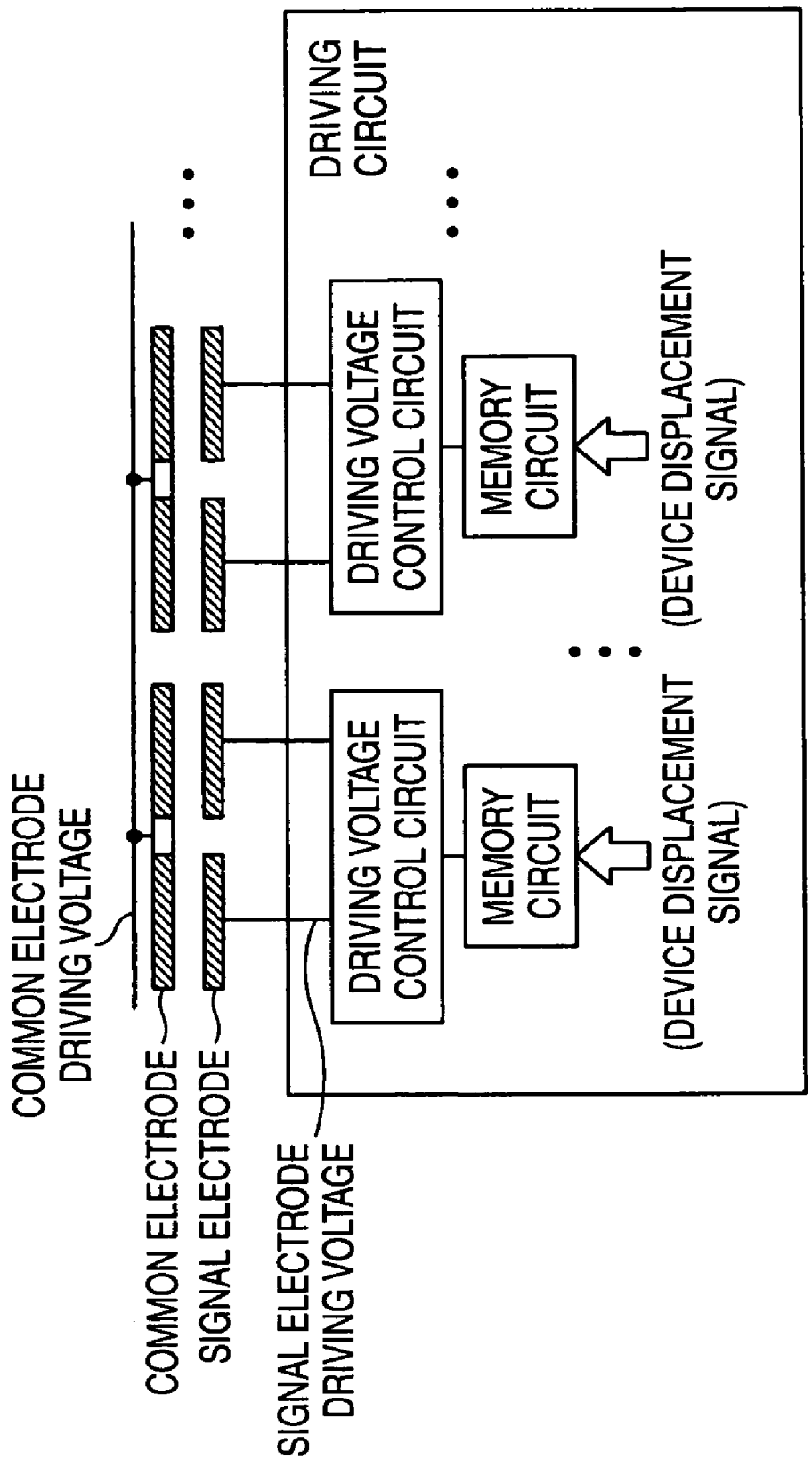
FIG. 20 is an explanatory view illustrating the configuration of a microelectromechanical modulation device array having a driving circuit in which each modulation device includes a memory circuit.
Figure 21A:
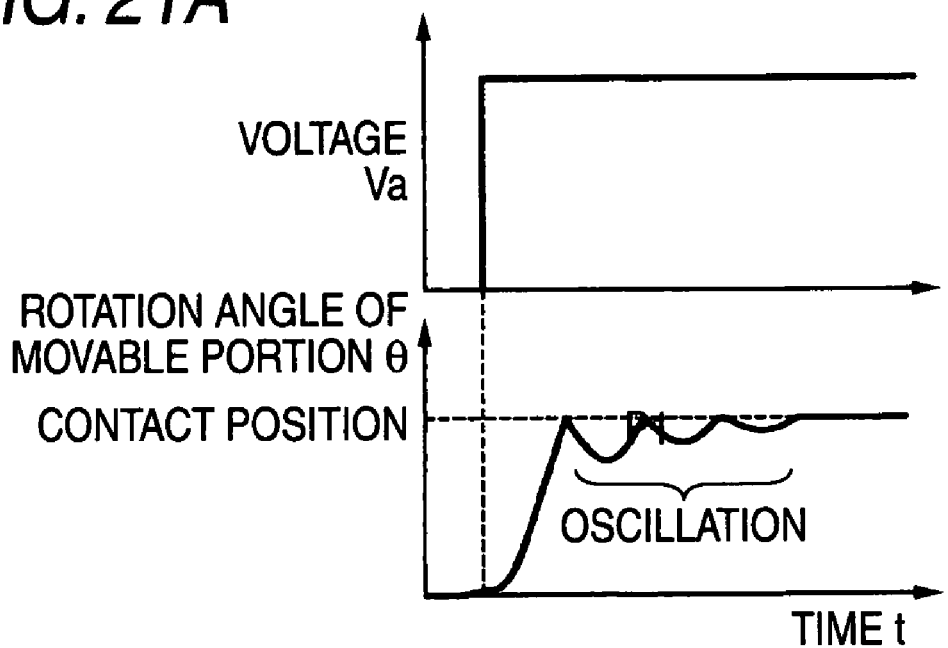
FIGS. 21A and 21B are explanatory views illustrating the oscillation of a movable portion, which occurs in a related microelectromechanical modulation device.
Figure 21B:
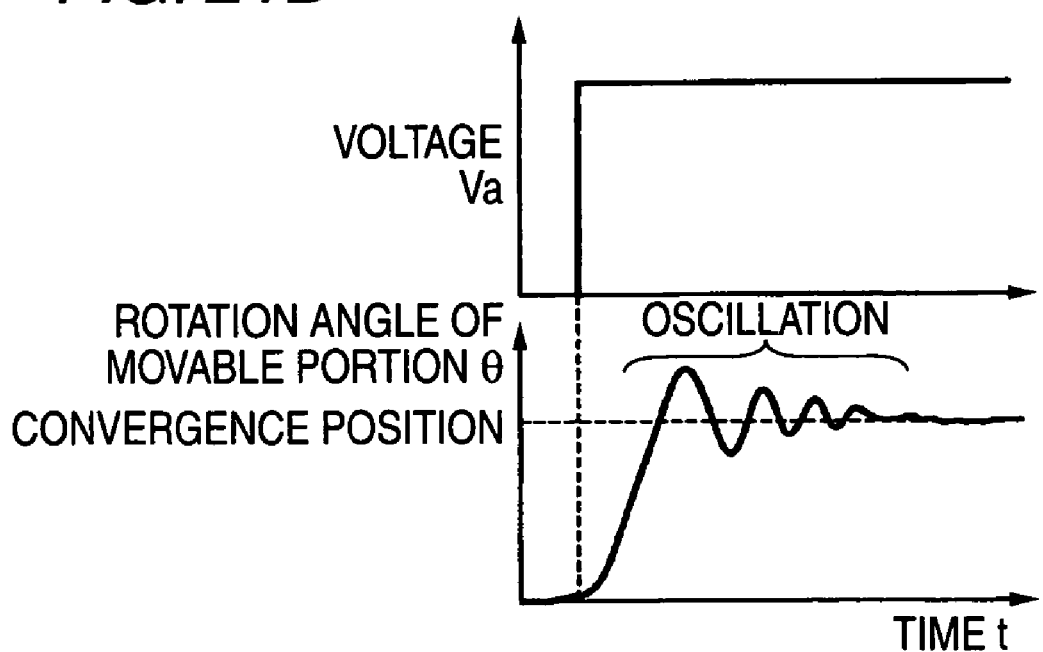
Figure 22A:
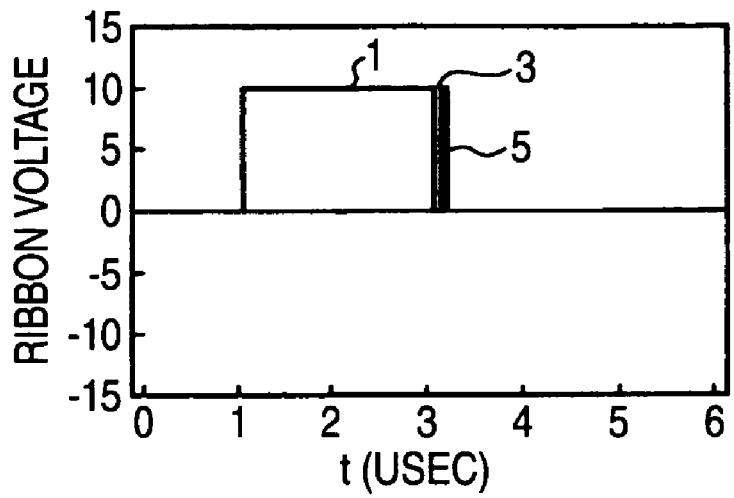
FIGS. 22A and 22B are explanatory views illustrating damping pulses applied in a related microelectromechanical grating device.
Figure 22B:
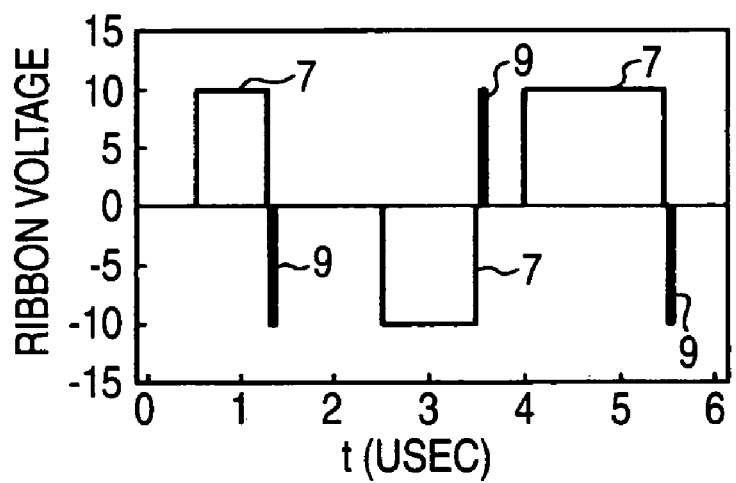
Figure 23A:
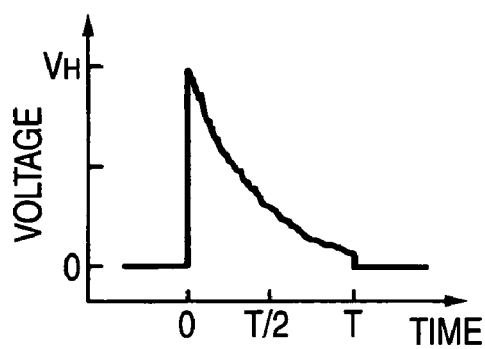
FIGS. 23A to 23D are explanatory views illustrating signal voltage waveforms applied in a related optical path switching device.
Figure 23B:
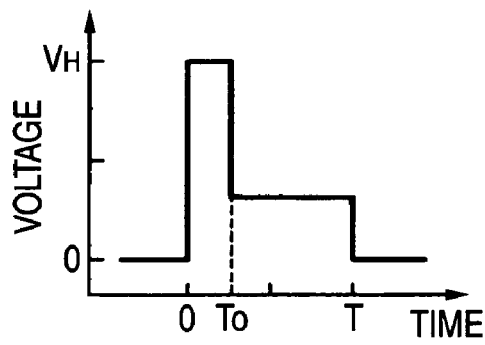
Figure 23C:
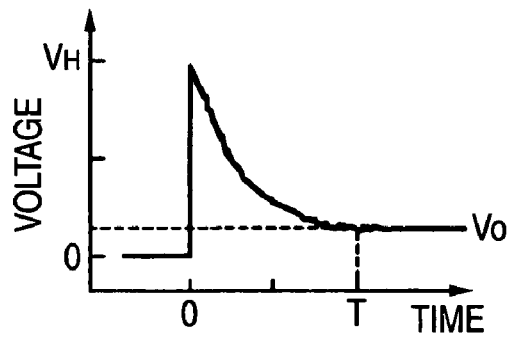
Figure 23D:
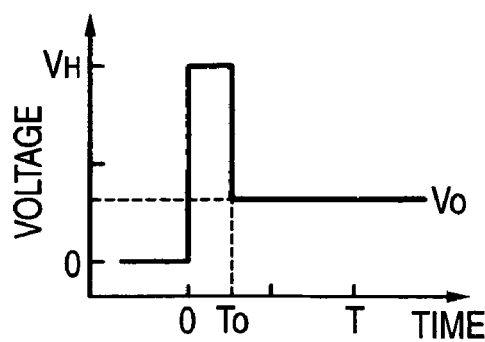
Figure 24A:
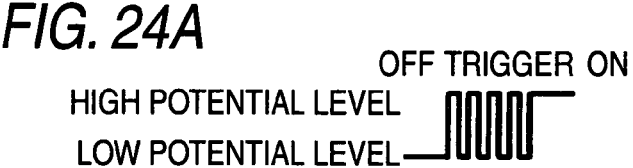
FIGS. 24A to 24H are explanatory views illustrating control signals applied according to a method of controlling a related micromachine device.
Figure 24B:
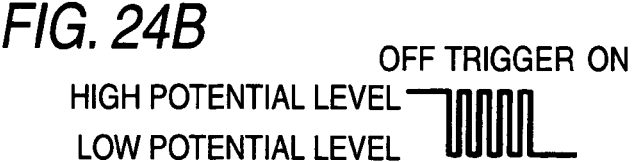
Figure 24C:
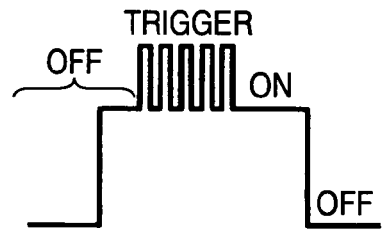
Figure 24D:
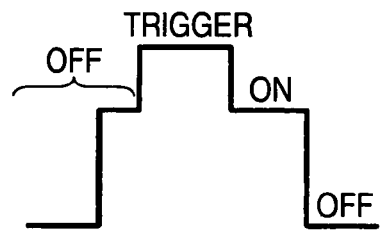
Figure 24E:
Figure 24F:
Figure 24G:
Figure 24H:

Further, it is preferable for the modulation array that each of the modulation devices thereof has a driving circuit including a memory circuit, similarly to a driving circuit of the modulation device array 100 shown in FIG. 1, which circuit is illustrated in FIG. 20 by way of example. The provision of such a memory circuit enables the preliminary writing of an device displacement signal to the memory circuit. That is, an device displacement signal is preliminarily written to the memory circuit. At the switching of the modulation devices, the device displacement signal stored in the memory circuit of each of the modulation devices, and the drive voltage according to the invention are outputted with desired timing to the signal electrodes of the modulation devices by a driving-voltage control circuit that controls voltages to be applied to the modulation devices. At that time, a predetermined voltage is outputted to the common electrode (or the movable portion).

When each of the devices is driven by using the memory circuit in this way, each of the plural modulation devices can easily be operated in an optional driving pattern. Thus, higher-speed active driving can be achieved. Incidentally, although FIG. 20 shows the modulation devices of the light modulation device array 100 shown in FIG. 1, the modulation devices of the array according to the invention are not limited thereto. The modulation devices of the array according to the invention may be those of another modulation device array.

Also, preferably, the modulation device array is provided with a control portion that modulation-drives the movable portions.

In the modulation device array having such a control portion, the movable portion is drive-controlled. Thus, before the movable portion reaches the final displacement position, the reduction, or increase, or increase/decrease of the absolute value of the interelectrode voltage between the movable electrode and the fixed electrode is performed. This enables the suppression of oscillation due to a collision, which would be caused when the movable portion of the related device reached the final displacement position at a high speed, and also enables suppression of an overshoot.

An apparatus having the modulation device array of the aforementioned configuration may include a light source, an illuminating optical system adapted to irradiate light, which is outputted form the light source, to the modulation device array, and a projection optical system adapted to project light, which is outputted from the modulation device array, onto an image forming surface to thereby constitute an image forming apparatus.

An image forming apparatus having the aforementioned modulation device array can actively decrease the oscillation of the movable portion. The driving cycle can be reduced, as compared with a related apparatus. This enables high-speed exposure of a photosensitive material, and display in a higher-pixel projector. Further, an image forming apparatus (or an exposure apparatus) adapted to perform gradation control by switching on/off of exposing light can reduce an on/off time. Thus, higher gradation can be realized.

Incidentally, the timing, with which the voltage driving of each of the electrodes is performed, and the waveform of a voltage driving signal according to the invention are not limited to those described in the foregoing description, and may be appropriately changed without departing from the scope and spirit of the invention.

What is claimed is:

1. A microelectromechanical modulation device comprising:
   a movable portion, which is supported to be elastically and bi-directionally displaced and which has a modulation function; and
   a plurality of driving sources operative to apply a first physical action force and a second physical action force to said movable portion,
   wherein when said movable portion is displacement-driven in a first direction, the second physical action force is applied to said movable portion in a second direction different from the first direction by said drive sources to suppress oscillation of said movable portion while said movable portion is transited in the first direction, and
   wherein the first physical action force and the second physical action force are applied to the movable portion simultaneously.

2. The microelectromechanical modulation device according to claim 1, wherein
   the first physical action force is applied to said movable portion by said drive sources in the first direction while said movable portion is transited in the second direction after said movable portion is displacement-driven in the first direction.

3. The microelectromechanical modulation device according to claim 1, wherein
   the first physical action force and the second physical action force are exerted to a plurality of points of action of said movable portion.

4. The microelectromechanical modulation device according to claim 1,
   wherein when said movable portion reaches a final position of displacement in a specific direction, a speed of said movable portion is substantially 0.

5. The microelectromechanical modulation device according to claim 1,
   wherein the first physical action force and the second physical action force, which are exerted by said drive sources and which displaces said movable portion in the first direction and the second direction, are electrostatic force.

6. The microelectromechanical modulation device according to claim 1, wherein
   each of the first physical action forces and the second physical action force is applied so that a magnitude of the first physical action force and the second physical action force varies with time according to a pulse wave form whose ordinates represent magnitudes and whose abscissa represent time.

7. The microelectromechanical modulation device according to claim 6,
wherein wherein the first physical action force and the second physical action force are generated so that magnitudes of the first physical action forces and the second physical action force vary with time according to a plurality of pulse waveforms.

8. The microelectromechanical modulation device according to claim 1,
wherein a plurality of physical action forces can be set corresponding to each of directions of transition of said movable portion.

9. The microelectromechanical modulation device according to claim 1,
wherein when said movable portion reaches a final position of displacement in a specific direction, said movable portion touches a stopping member and is stopped.

10. A microelectromechanical modulation device array comprising said microelectromechanical modulation devices according to claim 1, which are one-dimensionally or two-dimensionally arranged.

11. The microelectromechanical modulation device array according to claim 10,
wherein each of said microelectromechanical modulation devices has a driving circuit including a memory circuit; and
at least one of a plurality of electrodes is provided on said movable portion and at least two fixed portions facing said movable portion is a signal electrode, to which an device displacement signal outputted from said driving circuit is inputted, and another of said plurality of electrodes is a common electrode.

12. The microelectromechanical modulation device array according to claim 10, wherein the modulation device further comprising:
a control portion adapted to modulation-drive each of said movable portions.

13. An image forming apparatus comprising:
a light source;
the microelectromechanical modulation device array according to claim 10;
an illuminating optical system adapted to irradiate light, which is outputted from said light source, onto said microelectromechanical modulation device array; and
a projection optical system adapted to project light, which is outputted from said microelectromechanical modulation device array, onto an image forming surface.

* * * * *